(12) United States Patent
Shibamura et al.

(10) Patent No.: US 8,992,374 B2
(45) Date of Patent: Mar. 31, 2015

(54) AUTOMATIC TRANSMISSION

(71) Applicant: Honda Motor Co., Ltd., Tokyo (JP)

(72) Inventors: Mariko Shibamura, Wako (JP); Soichi Sugino, Wako (JP); Kohei Iizuka, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/155,359

(22) Filed: Jan. 15, 2014

(65) Prior Publication Data

US 2014/0213408 A1 Jul. 31, 2014

(30) Foreign Application Priority Data

Jan. 31, 2013 (JP) ................. 2013-016735

(51) Int. Cl.
*F16H 3/44* (2006.01)
*F16H 3/66* (2006.01)
(52) U.S. Cl.
CPC ............ *F16H 3/66* (2013.01); *F16H 2200/006* (2013.01); *F16H 2200/2012* (2013.01); *F16H 2200/2043* (2013.01); *F16H 2200/2066* (2013.01); *F16H 2200/2082* (2013.01)
USPC ........... 475/280; 475/276; 475/277; 475/278; 475/284; 475/330
(58) Field of Classification Search
USPC .................. 475/271–290, 330, 348
See application file for complete search history.

(56) References Cited

U.S. PATENT DOCUMENTS

| 4,884,472 | A | 12/1989 | Miura et al. | |
|---|---|---|---|---|
| 6,634,980 | B1 * | 10/2003 | Ziemer | 475/275 |
| 6,960,149 | B2 * | 11/2005 | Ziemer | 475/276 |
| 7,037,232 | B2 * | 5/2006 | Ishimaru | 475/275 |
| 7,267,630 | B2 | 9/2007 | Tabata et al. | |
| 7,524,257 | B2 | 4/2009 | Tabata et al. | |
| 8,152,683 | B2 * | 4/2012 | Phillips | 475/275 |
| 2011/0224045 | A1 | 9/2011 | Hukill et al. | |

FOREIGN PATENT DOCUMENTS

| JP | 63-145847 | 6/1988 |
|---|---|---|
| JP | 2005-127497 | 5/2005 |
| JP | 2005-273768 | 10/2005 |
| JP | 4711869 B2 | 10/2007 |
| JP | 2011-149522 | 8/2011 |

OTHER PUBLICATIONS

Japanese Office Action for corresponding JP Application No. 2013-016735, Jul. 16, 2014.

* cited by examiner

*Primary Examiner* — Michael Mansen
*Assistant Examiner* — Tinh Dang
(74) *Attorney, Agent, or Firm* — Mori & Ward, LLP (57) ABSTRACT

An automatic transmission includes an input shaft, first, second, third, and fourth planetary gear sets, a plurality of engagement mechanisms, and an output member. The input shaft is rotatably supported inside a transmission case to be rotated by a driving force received from a drive source. The first, second, third, and fourth planetary gear sets are arranged in sequence along an axis line of the input shaft and each include three elements having a sun gear, a carrier, and a ring gear. The plurality of engagement mechanisms each releasably connect two of the three elements with each other or releasably connect one of the three elements to the transmission case. The output member is disposed on outer circumferences of the second and third planetary gear sets and connected to the ring gear of one of the second and third planetary gear sets to output rotation of the input shaft.

7 Claims, 7 Drawing Sheets

| | B1 | B2 | B3 | C1 | C2 | C3 | TRANSMISSION GEAR RATIO | COMMON RATIO |
|---|---|---|---|---|---|---|---|---|
| Rvs | | F | ○ | | | ○ | 4.008 | |
| 1st | ○ | R/F | ○ | | | | 5.233 | 1.554 |
| 2nd | ○ | R | ○ | | ○ | | 3.367 | 1.465 |
| 3rd | ○ | R | ○ | | | ○ | 2.298 | 1.348 |
| 4th | ○ | R | | ○ | ○ | ○ | 1.705 | 1.251 |
| 5th | ○ | R | | ○ | | ○ | 1.363 | 1.363 |
| 6th | | R | | ○ | ○ | ○ | 1.000 | 1.273 |
| 7th | | R | ○ | | ○ | ○ | 0.786 | 1.196 |
| 8th | | R | ○ | | ○ | | 0.657 | |

| | B1 | B2 | B3 | B4 | C1 | C2 | C3 | TRANSMISSION GEAR RATIO | COMMON RATIO |
|---|---|---|---|---|---|---|---|---|---|
| Rvs | | F | ○ | | | | ○ | 4.008 | |
| 1st | ○ | R/F | ○ | | | | | 5.233 | 1.554 |
| 2nd | ○ | R | ○ | | | ○ | | 3.367 | 1.465 |
| 3rd | ○ | R | ○ | | | | ○ | 2.298 | 1.348 |
| 4th | ○ | R | | | | ○ | ○ | 1.705 | 1.251 |
| 5th | ○ | R | | | ○ | | ○ | 1.363 | 1.363 |
| 6th | | R | ○ | | ○ | ○ | ○ | 1.000 | 1.273 |
| 7th | | R | ○ | | ○ | ○ | | 0.786 | 1.196 |
| 8th | | R | ○ | | ○ | | | 0.657 | 1.126 |
| 9th | | R | | ○ | ○ | ○ | | 0.584 | 1.120 |
| 10th | | R | | ○ | | ○ | | 0.520 | |

AUTOMATIC TRANSMISSION

CROSS-REFERENCE TO RELATED APPLICATIONS

The present application claims priority under 35 U.S.C. §119 to Japanese Patent Application No. 2013-016735, filed Jan. 31, 2013, entitled "Automatic Transmission." The contents of this application are incorporated herein by reference in their entirety.

BACKGROUND

1. Field

The present disclosure relates to an automatic transmission.

2. Description of the Related Art

An automatic transmission capable of providing 8-forward-speed transmission using a first planetary gear set for input, second and third planetary gear sets for varying the speed, and six engagement mechanisms has been developed (refer to, for example, Japanese Unexamined Patent Application Publication No. 2005-273768).

According to Japanese Unexamined Patent Application Publication No. 2005-273768, the first planetary gear set for input is formed as a double pinion planetary gear set. In addition, each of a second planetary gear set and a third gear set for varying the speed is formed as a Ravigneaux planetary gear set. The six engagement mechanisms include four wet multiple disc clutches and two brakes.

For example, as indicated by a detailed diagram in FIG. 2 of Japanese Patent No. 4711869, the automatic transmission includes eight trains along the axis line of the input shaft. More specifically, beginning with the side closest to the torque converter, a first train is formed from a fourth wet multiple disc clutch, a second train is formed from a first planetary gear set, a third train is formed from the first wet multiple disc clutch, a fourth train is formed from a third wet multiple disc clutch (note that although the third wet multiple disc clutch seems to be in the same train as the first planetary gear set in a skeleton diagram, a piston and a hydraulic pathway for a third clutch are formed between the first wet multiple disc clutch and an output gear, in reality), a fifth train is formed from the output gear, a sixth train is formed from a second planetary gear set, a seventh train is formed from a third planetary gear set, and an eighth train is formed from a second wet multiple disc clutch.

SUMMARY

According to one aspect of the present disclosure, an automatic transmission includes a transmission case, an input shaft, first, second, third, and fourth planetary gear sets, a plurality of engagement mechanisms, and an output member. The input shaft is rotatably supported inside the transmission case to be rotated by a driving force received from a drive source. The first, second, third, and fourth planetary gear sets are arranged in sequence along an axis line of the input shaft and each include three elements having a sun gear, a carrier, and a ring gear. The plurality of engagement mechanisms each releasably connect two of the three elements with each other or releasably connect one of the three elements to the transmission case. The output member is disposed on outer circumferences of the second and third planetary gear sets and connected to the ring gear of one of the second and third planetary gear sets to output rotation of the input shaft which is capable of being changed to a plurality of rotational speeds by combining a connection mode and a release mode of each of the engagement mechanisms.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

The embodiments will now be described with reference to the accompanying drawings, wherein like reference numerals designate corresponding or identical elements throughout the various drawings.

First Exemplary Embodiment

Figure 1:
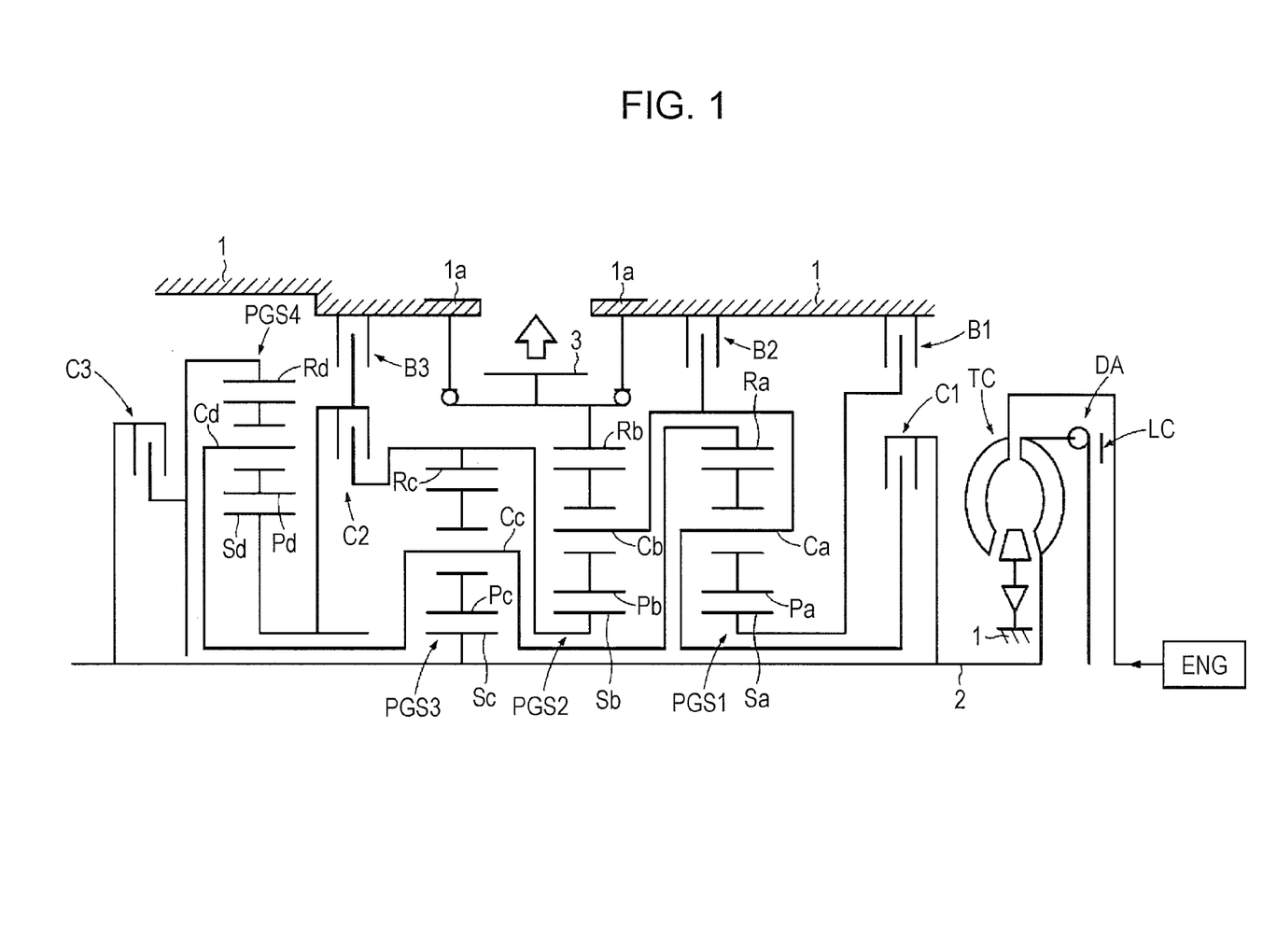
FIG. 1 is a skeleton diagram of an automatic transmission according to a first exemplary embodiment of the present disclosure.

As illustrated in FIG. 1, according to a first exemplary embodiment of the present disclosure, an automatic transmission includes an input shaft 2 rotatably supported in a transmission case 1 and an output gear 3, which is an output member having an axis that is the same as the axis of the input shaft 2. A driving force output from a drive source ENG, such as an internal combustion engine (an engine), is transferred to the input shaft 2 via a torque converter TC including a lockup clutch LC and a damper DA.

The rotation of the output gear 3 is transferred to the right and left drive wheels of a vehicle via a differential gear and a propeller shaft (neither is illustrated). Note that instead of the torque converter TC, a single disc start clutch or a multiple disc start clutch that is frictionally engageable may be employed.

In the transmission case 1, first to fourth planetary gear sets PGS1 to PGS4 are arranged so as to be concentric with the input shaft 2. The first planetary gear set PGS1 is a single-pinion planetary gear set including a sun gear Sa, a ring gear Ra, and a carrier Ca that supports a pinion Pa meshed with the sun gear Sa and the ring gear Ra so that the pinion Pa is rotatable about its axis and is revolvable around the sun gear Sa. When the carrier is fixed and if the sun gear is rotated, the ring gear rotates in opposite direction to the sun gear rotation.

Accordingly, a single-pinion planetary gear set is also referred to as a "minus planetary gear set" or a "negative planetary gear set". Note that when the ring gear is fixed and if the sun gear is rotated, the carrier and the sun gear rotate in the same direction.

Figure 3:
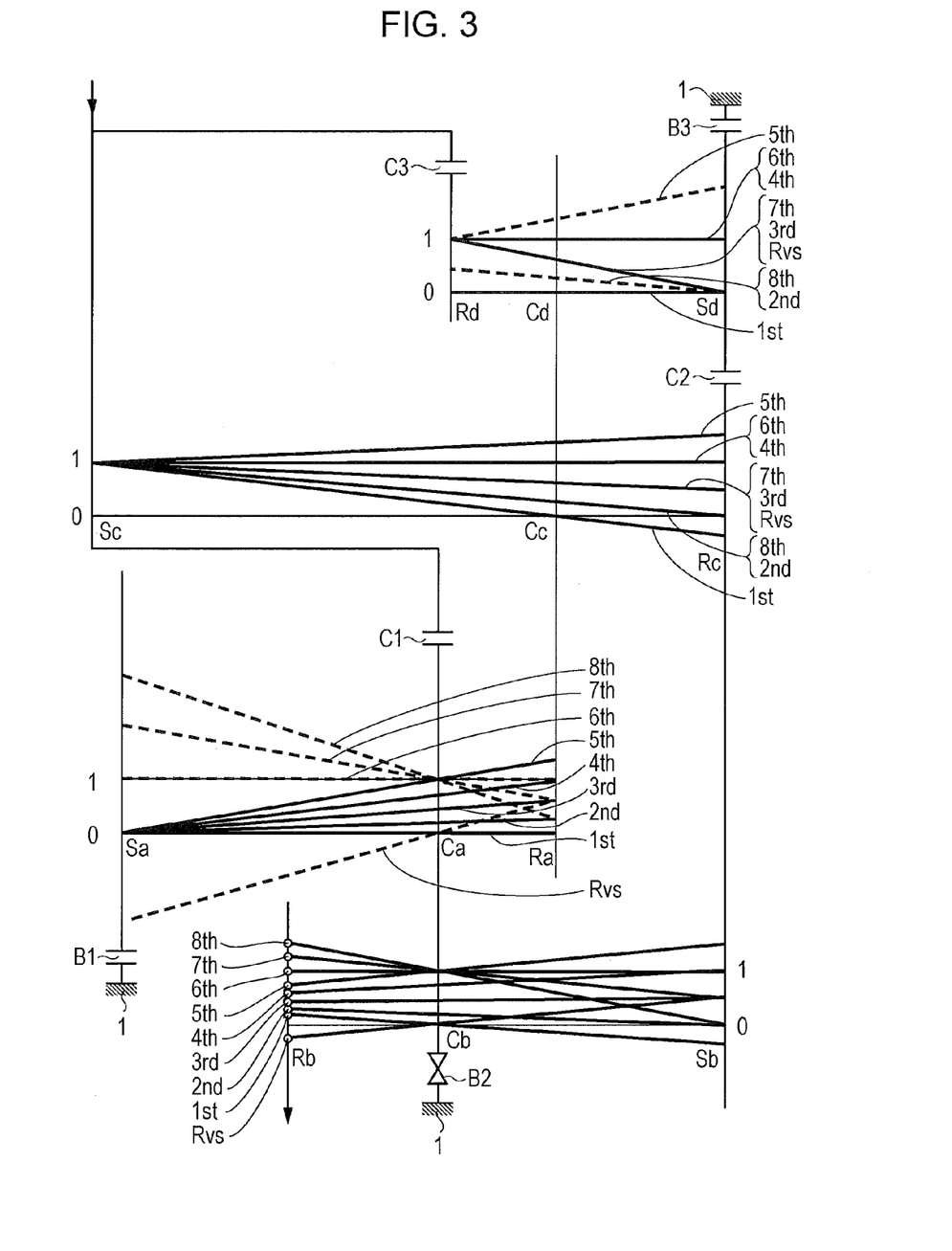
FIG. 3 is a collinear diagram illustrating the relative speed ratios of the elements of the first to fourth planetary gear sets of the automatic transmission according to the first exemplary embodiment.

Referring to a collinear diagram (a diagram indicating relative rotational speed ratios among three elements, that is, a sun gear, a carrier, and a ring gear, in the form of straight lines (speed lines)) of the first planetary gear set PGS1 illustrated in a third section from the top of FIG. 3, let three elements Sa, Ca, and Ra of the first planetary gear set PGS1 denote a first element, a second element, and a third element arranged from the left at intervals corresponding to the gear ratios (the number of the teeth of the ring gear/the number of the teeth of the sun gear). Then, the first element corresponds to the sun gear Sa, the second element corresponds to the carrier Ca, and the third element corresponds to the ring gear Ra. Herein, let "h" be a variable that denotes the gear ratio of the first planetary gear set PGS1. Then, the ratio of the distance between the sun gear Sa and the carrier Ca to the distance between the carrier Ca and the ring gear Ra is set to h:1, where "h" is a variable that denotes the gear ratio of the first planetary gear set PGS1.

Similarly, the second planetary gear set PGS2 is a single-pinion planetary gear set including a sun gear Sb, a ring gear Rb, and a carrier Cb that supports a pinion Pb meshed with the sun gear Sb and the ring gear Rb so that the pinion Pb is rotatable about its axis and is revolvable around the sun gear Sb.

Referring to the collinear diagram of the second planetary gear set PGS2 illustrated in a fourth section (the lowermost section) of FIG. 3, let three elements Rb, Cb, and Sb of the second planetary gear set PGS2 denote a fourth element, a fifth element, and a sixth element arranged from the left at intervals corresponding to the gear ratios. Then, the fourth element corresponds to the ring gear Rb, the fifth element corresponds to the carrier Cb, and the sixth element corresponds to the sun gear Sb. The ratio of the distance between the sun gear Sb and the carrier Cb to the distance between the carrier Cb and the ring gear Rb is set to i:1, where "i" is a variable that denotes the gear ratio of the second planetary gear set PGS2.

Similarly, the third planetary gear set PGS3 is a single-pinion planetary gear set including a sun gear Sc, a ring gear Rc, and a carrier Cc that supports a pinion Pc meshed with the sun gear Sc and the ring gear Rc so that the pinion Pc is rotatable about its axis and is revolvable around the sun gear Sc.

Referring to the collinear diagram of the third planetary gear set PGS3 illustrated in a second section from the top of FIG. 3, let three elements Sc, Cc, and Rc of the third planetary gear set PGS3 denote a seventh element, an eighth element, and a ninth element arranged from the left at intervals corresponding to the gear ratios. Then, the seventh element corresponds to the sun gear Sc, the eighth element corresponds to the carrier Cc, and the ninth element corresponds to the ring gear Rc.

The ratio of the distance between the sun gear Sc and the carrier Cc to the distance between the carrier Cc and the ring gear Rc is set to j:1, where "j" denotes the gear ratio of the third planetary gear set PGS3. Note that in the collinear diagram, the lower horizontal line indicates that the rotational speed is "0". In contrast, the upper horizontal line (a line that overlaps the line indicated by "4th" and "6th") indicates that the rotational speed is "1" (i.e., the rotational speed is the same as the rotational speed of the input shaft 2).

Similarly, the fourth planetary gear set PGS4 is a single-pinion planetary gear set including a sun gear Sd, a ring gear Rd, and a carrier Cd that supports a pinion Pd meshed with the sun gear Sd and the ring gear Rd so that the pinion Pd is rotatable about its axis and is revolvable around the sun gear Sd.

Referring to the collinear diagram of the fourth planetary gear set PGS4 illustrated in a first section (the uppermost section) from the top of FIG. 3, let three elements Rd, Cd, and Sd of the fourth planetary gear set PGS4 denote a tenth element, an eleventh element, and a twelfth element arranged from the left at intervals corresponding to the gear ratios. Then, the tenth element corresponds to the ring gear Rd, the eleventh element corresponds to the carrier Cd, and the twelfth element corresponds to the sun gear Sd. The ratio of the distance between the sun gear Sd and the carrier Cd to the distance between the carrier Cd and the ring gear Rd is set to k:1, where "k" is a variable that denotes the gear ratio of the fourth planetary gear set PGS4.

The sun gear Sc (the seventh element) of the third planetary gear set PGS3 is directly connected to the input shaft 2. In addition, the ring gear Rb (the fourth element) of the second planetary gear set PGS2 is directly connected to the output gear 3.

In addition, the carrier Cc (the eighth element) of the third planetary gear set PGS3 is connected to the ring gear Ra (the third element) of the first planetary gear set PGS1 and the carrier Cd (the eleventh element) of the fourth planetary gear set PGS4 and, thus, a first connected member Cc-Ra-Cd is formed. In addition, the ring gear Rc (the ninth element) of the third planetary gear set PGS3 is connected to the sun gear Sb (the sixth element) of the second planetary gear set PGS2 and, thus, a second connected member Rc-Sb is formed. Furthermore, the carrier Ca (the second element) of the first planetary gear set PGS1 is connected to the carrier Cb (the fifth element) of the second planetary gear set PGS2 and, thus, a third connected member Ca-Cb is formed.

Furthermore, according to the present exemplary embodiment, the automatic transmission includes six engagement mechanisms formed from three clutches, that is, first to third clutches C1 to C3, and three brakes, that is, first to third brakes B1 to B3.

The first clutch C1 is an oil pressure driven wet multiple disc clutch. The first clutch C1 is configured so as to be switchable between a connection mode in which the sun gear Sc (the seventh element) of the third planetary gear set PGS3 is connected to the third connected member Ca-Cb and a release mode in which the sun gear Sc is disconnected from the third connected member Ca-Cb.

The second clutch C2 is an oil pressure driven wet multiple disc clutch. The second clutch C2 is configured so as to be switchable between a connection mode in which the sun gear Sd (the twelfth element) of the fourth planetary gear set PGS4 is connected to the second connected member Rc-Sb and a release mode in which the sun gear Sd is disconnected from the second connected member Rc-Sb.

The third clutch C3 is an oil pressure driven wet multiple disc clutch. The third clutch C3 is configured so as to be switchable between a connection mode in which the sun gear Sc (the seventh element) of the third planetary gear set PGS3 is connected to the ring gear Rd (the tenth element) of the fourth planetary gear set PGS4 and a release mode in which the sun gear Sc is disconnected from the ring gear Rd.

The first brake B1 is an oil pressure driven wet multiple disc brake. The first brake B1 is configured so as to be switchable between a fixed mode in which the sun gear Sa (the first element) of the first planetary gear set PGS1 is fixed to the transmission case 1 and a release mode in which the sun gear Sa is unfixed from the transmission case 1. Note that the first brake B1 may be formed from a two-way clutch.

The second brake B2 is formed from a two-way clutch. The second brake B2 is configured so as to be switchable between a forward rotation prevention mode in which forward rotation of the third connected member Ca-Cb is prevented and a reverse rotation prevention mode in which reverse rotation of the third connected member Ca-Cb is prevented.

When the second brake B2 formed from a two-way clutch is in the forward rotation prevention mode and if a force that tends to rotate the third connected member Ca-Cb in the forward rotation direction is exerted on the third connected member Ca-Cb, rotation of the third connected member Ca-Cb is prevented. Thus, the second brake B2 enters a fixed mode in which the second brake B2 is fixed to the transmission case 1. In contrast, if a force that tends to rotate the third connected member Ca-Cb in the reverse rotation direction is exerted on the third connected member Ca-Cb, rotation of the third connected member Ca-Cb is allowed. Thus, the second brake B2 enters a release mode.

In addition, when second brake B2 formed from a two-way clutch is in the reverse rotation prevention mode and if a force that tends to rotate the third connected member Ca-Cb in the forward rotation direction is exerted on the third connected member Ca-Cb, rotation of the third connected member Ca-Cb is allowed. Thus, the second brake B2 enters a release mode. In contrast, if a force that tends to rotate the third connected member Ca-Cb in the reverse rotation direction is exerted on the third connected member Ca-Cb, rotation of the third connected member Ca-Cb is prevented. Thus, the second brake B2 enters a fixed mode in which the second brake B2 is fixed to the transmission case 1.

Note that the second brake B2 may be formed as an oil pressure driven wet multiple disc brake. At that time, the second brake B2 formed as a wet multiple disc brake may additionally has a one-way clutch that allows forward rotation of the third connected member Ca-Cb and prevents reverse rotation of the third connected member Ca-Cb.

The third brake B3 is an oil pressure driven wet multiple disc brake. The third brake B3 is configured so as to be switchable between a fixed mode in which the sun gear Sd (the twelfth element) of the fourth planetary gear set PGS4 is fixed to the transmission case 1 and a release mode in which the sun gear Sd is unfixed from the transmission case 1.

The mode of each of the clutches C1 to C3 and the brakes B1 to B3 is switchable on the basis of vehicle information, such as a travel speed of the vehicle, under the control of a transmission control unit (not illustrated).

The first clutch C1, the first planetary gear set PGS1, the second planetary gear set PGS2, the third planetary gear set PGS3, the second clutch C2, the fourth planetary gear set PGS4, and the third clutch C3 are arranged along the axis line of the input shaft 2 in sequence from the side of the drive source ENG and the torque converter TC.

Figure 2:
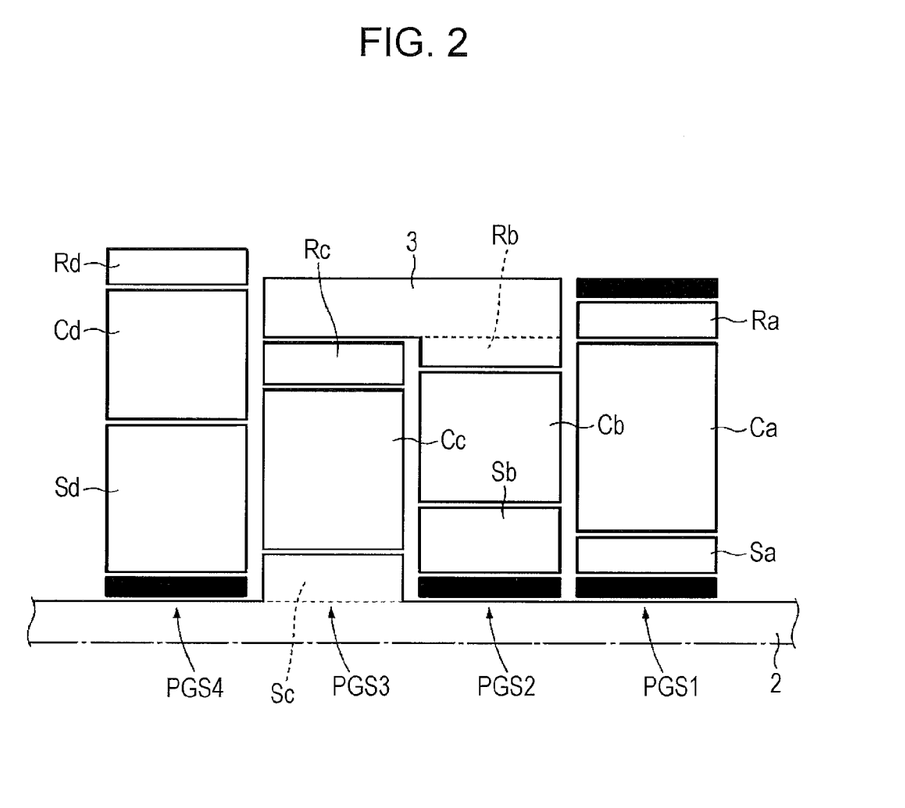
FIG. 2 is a schematic illustration of arrangement of elements of first to fourth planetary gear sets of the automatic transmission.

As illustrated in FIGS. 1 and 2, the output gear 3 is disposed outward of the second planetary gear set PGS2 and the third planetary gear set PGS3 in the radial direction. In addition, the sun gear Sc (the seventh element) of the third planetary gear set PGS3 is integrated with the input shaft 2, and the ring gear Rb (the fourth element) of the second planetary gear set PGS2 is integrated with the output gear 3. The sun gear Sc (the seventh element) of the third planetary gear set PGS3 is fixedly integrated with the input shaft 2 using, for example, spline fitting. The ring gear Rb (the fourth element) of the second planetary gear set PGS2 is also fixedly integrated with the output gear 3 using, for example, spline fitting. Note that black boxes illustrated in FIG. 2 indicate part of the first to third connected members.

By disposing the output gear 3 outward of the second planetary gear set PGS2 and the third planetary gear set PGS3 in the radial direction in this manner, the output gear 3 overlaps the second planetary gear set PGS2 and the third planetary gear set PGS3 in the radial direction and, thus, the shaft length of the automatic transmission can be decreased.

Note that the output gear 3 can at least partially overlap the second planetary gear set PGS2 or the third planetary gear set PGS3 in the radial direction. In this manner, the shaft length of the automatic transmission can be decreased. However, if the output gear 3, the second planetary gear set PGS2, and the third planetary gear set PGS3 completely overlap one another in the radial direction, the shaft length of the automatic transmission can be minimized.

Alternatively, the first planetary gear set PGS1, the first clutch C1, the second planetary gear set PGS2, the third planetary gear set PGS3, the second clutch C2, the fourth planetary gear set PGS4, and the third clutch C3 may be arranged along the axis line of the input shaft 2 in sequence from the side of the drive source ENG and the torque converter TC. However, in such a case, a hub of the first connected member Cc-Ra-Cd and a hub of the third connected member Ca-Cb are disposed outward of the first clutch C1 in the radial direction. Accordingly, the size of the automatic transmission increases in the radial direction, and the weight of the automatic transmission increases.

Still alternatively, the first planetary gear set PGS1, the first clutch C1, the third planetary gear set PGS3, the second planetary gear set PGS2, the second clutch C2, the fourth planetary gear set PGS4, and the third clutch C3 may be arranged along the axis line of the input shaft 2 in sequence from the side of the drive source ENG and the torque converter TC. However, in such a case, a hub of the third connected member Ca-Cb is disposed outward of the third planetary gear set PGS3 in the radial direction. Accordingly, it is difficult to dispose the hub of the third connected member Ca-Cb inward of the output gear 3 in the radial direction.

In addition, the first brake B1 is disposed outward of the first clutch C1 in the radial direction, the second brake B2 is disposed outward of the first planetary gear set PGS1 in the radial direction, and the third brake B3 is disposed outward of the second clutch C2 in the radial direction.

By disposing the three brakes B1 to B3 outward of the planetary gear set or the clutch in the radial direction in this manner, the shaft length of the automatic transmission can be more decreased than in the configuration in which the brakes B1 to B3 are disposed along the axis line of the input shaft 2 together with the planetary gear set and the clutch. Note that the third brake B3 may be disposed outward of the third clutch C3 and the fourth planetary gear set PGS4 in the radial direction.

In addition, both ends of the output gear 3 in the axial direction are supported by an inner wall member 1a of the transmission case 1 via ball bearings. If the inner wall member 1a serves as a center support of the transmission case 1, the output gear 3 is supported by the center support at its both ends. Accordingly, the concentricity of the elements can be easily and accurately maintained. Moreover, the reaction forces acting in the radial direction can be partially cancelled each other out and can be transferred to the transmission case 1.

A technique for establishing each of the gear ratios of the automatic transmission according to the first exemplary embodiment is described below with reference to FIGS. 3 and 4.

To achieve a first transmission gear ratio, the first brake B1 is set in the fixed mode, the second brake B2 formed from a two-way clutch is set in the reverse rotation prevention mode, and the third brake B3 is set in the fixed mode. By setting the second brake B2 in the reverse rotation prevention mode, reverse rotation of the third connected member Ca-Cb is prevented. By setting the first brake B1 in the fixed mode, the rotational speed of the sun gear Sa (the first element) of the first planetary gear set PGS1 can be set to "0".

In this manner, the first to third elements Sa, Ca, and Ra of the first planetary gear set PGS1 enter a lock mode in which relative rotation of the elements is disabled. Accordingly, the rotational speed of the first connected member Cc-Ra-Cd including the ring gear Ra (the third element) of the first planetary gear set PGS1 is also set to "0". In addition, the rotational speed of the ring gear Rb (the fourth element) of the second planetary gear set PGS2 having the output gear 3 connected thereto is set to "1st" illustrated in FIG. 3. In this manner, the first transmission gear ratio is established.

Note that the third brake B3 need not be set in the fixed mode when the first transmission gear ratio is established. However, in order to smoothly change from the first transmission gear ratio to a second transmission gear ratio (described below), the third brake B3 is set in the fixed mode in the first transmission gear ratio. In addition, in order to activate an engine brake in the first transmission gear ratio, the second brake B2 formed from a two-way clutch can be switched to the forward rotation prevention mode.

In order to establish a second transmission gear ratio, the first brake B1 is set in a fixed mode, the second brake B2 formed from a two-way clutch is set in the reverse rotation prevention mode, the third brake B3 is set in a fixed mode, and the second clutch C2 is set in a connection mode. By setting the second brake B2 in the reverse rotation prevention mode, forward rotation of the third connected member Ca-Cb is allowed. In addition, by setting the first brake B1 in the fixed mode, the rotational speed of the sun gear Sa (the first element) of the first planetary gear set PGS1 is set to "0". Furthermore, by setting the third brake B3 in the fixed mode, the rotational speed of the sun gear Sd (the twelfth element) of the fourth planetary gear set PGS4 is set to "0".

In addition, by setting the second clutch C2 in a connection mode, the rotational speed of the second connected member Rc-Sb is set to "0", which is the same rotational speed as that of the sun gear Sd (the twelfth element) of the fourth planetary gear set PGS4. Furthermore, the rotational speed of the ring gear Rb (the fourth element) of the second planetary gear set PGS2 having the output gear 3 connected thereto is set to "2nd" illustrated in FIG. 3. In this manner, the second transmission gear ratio is established.

In order to establish a third transmission gear ratio, each of the first brake B1 and the third brake B3 is set in a fixed mode. In addition, the second brake B2 formed from a two-way clutch is set in the reverse rotation prevention mode, and the third clutch C3 is set in a connection mode. By setting the second brake B2 in the reverse rotation prevention mode, forward rotation of the third connected member Ca-Cb is allowed. In addition, by setting the first brake B1 in the fixed mode, the rotational speed of the sun gear Sa (the first element) of the first planetary gear set PGS1 is set to "0". Furthermore, by setting the third brake B3 in the fixed mode, the rotational speed of the sun gear Sd (the twelfth element) of the fourth planetary gear set PGS4 is set to "0".

In addition, by setting the third clutch C3 in a connection mode, the rotational speed of the ring gear Rd (the tenth element) of the fourth planetary gear set PGS4 is set to "1", which is the same rotational speed as that of the sun gear Sc (the seventh element) of the third planetary gear set PGS3 connected to the input shaft 2. Since the rotational speed of the sun gear Sd (the twelfth element) of the fourth planetary gear set PGS4 is set to "0" and the rotational speed of the ring gear Rd (the tenth element) is set to "1", the rotational speed of the carrier Cd (the eleventh element), that is, the rotational speed of the first connected member Cc-Ra-Cd, is set to $k/(k+1)$. In addition, the rotational speed of the ring gear Rb (the fourth element) of the second planetary gear set PGS2 having the output gear 3 connected thereto is set to "3rd" illustrated in FIG. 3. In this manner, the third transmission gear ratio is established.

In order to establish a fourth transmission gear ratio, the first brake B1 is set in a fixed mode, the second brake B2 formed from the two-way clutch is set in the reverse rotation prevention mode, and each of the second clutch C2 and the third clutch C3 is set in a connection mode. By setting the second brake B2 in the reverse rotation prevention mode, forward rotation of the third connected member Ca-Cb is allowed. In addition, by setting the first brake B1 in the fixed mode, the rotational speed of the sun gear Sa (the first element) of the first planetary gear set PGS1 is set to "0".

Furthermore, by setting the second clutch C2 in the connection mode, the sun gear Sd (the twelfth element) of the fourth planetary gear set PGS4 and the second connected member Rc-Sb rotate at the same speed. Thus, the carrier Cc (the eighth element) of the third planetary gear set PGS3 is connected to the carrier Cd (the eleventh element) of the fourth planetary gear set PGS4, and the ring gear Rc (the ninth element) of the first planetary gear set PGS3 is connected to the sun gear Sd (the twelfth element) of the fourth planetary gear set PGS4. Accordingly, in the fourth transmission gear ratio in which the second clutch C2 is set in a connection mode, a collinear diagram including four rotary elements in the third planetary gear set PGS3 and the fourth planetary gear set PGS4 can be obtained.

By setting the third clutch C3 in a connection mode, the rotational speed of the ring gear Rd (the tenth element) of the fourth planetary gear set PGS4 is set to the same speed "1", which is the same rotational speed as that of the sun gear Sc (the seventh element) of the third planetary gear set PGS3. Accordingly, two of the four rotary elements formed from the third planetary gear set PGS3 and the fourth planetary gear set PGS4 have the same rotational speed "1".

Accordingly, all the elements of the third planetary gear set PGS3 and the fourth planetary gear set PGS4 are set in a lock mode in which relative rotation of the elements is disabled and, thus, the rotational speeds of all of the elements of the third planetary gear set PGS3 and the fourth planetary gear set PGS4 are set to "1". In addition, the rotational speed of the third connected member Ca-Cb is set to $h/(h+1)$, and the rotational speed of the ring gear Rb (the fourth element) of the second planetary gear set PGS2 having the output gear 3 connected thereto is set to "4th" illustrated in FIG. 3. In this manner, the fourth transmission gear ratio is established.

In order to establish a fifth transmission gear ratio, the first brake B1 is set in a fixed mode, the second brake B2 formed from a two-way clutch is set in the reverse rotation prevention mode, and each of the first clutch C1 and the third clutch C3 is set in a connection mode. By setting the second brake B2 in the reverse rotation prevention mode, forward rotation of the third connected member Ca-Cb is allowed. In addition, by setting the first brake B1 in the fixed mode, the rotational speed of the sun gear Sa (the first element) of the first planetary gear set PGS1 is set to "0".

In addition, by setting the first clutch C1 in a connection mode, the rotational speed of the third connected member Ca-Cb is set to "1", which is the same rotational speed as that of the sun gear Sc (the seventh element) of the third planetary gear set PGS3. Thus, the rotational speed of the ring gear Rb (the fourth element) of the second planetary gear set PGS2 having the output gear 3 connected thereto is set to "5th" illustrated in FIG. 3. In this manner, the fifth transmission gear ratio is established.

Note that in order to establish the fifth transmission gear ratio, the third clutch C3 need not be set in the connection mode. However, in the fourth transmission gear ratio and the sixth transmission gear ratio (described in more detail below), the third clutch C3 needs to be set in a connection mode. Accordingly, in order to smoothly perform downshift from the fifth gear to the fourth gear and upshift from the fifth gear to the sixth gear, the third clutch C3 is set in the connection mode even in the fifth transmission gear ratio.

In order to establish a sixth transmission gear ratio, the second brake B2 formed from a two-way clutch is set in the reverse rotation prevention mode, and each of the first to third clutches C1 to C3 is set in a connection mode. By setting the second brake B2 in the reverse rotation prevention mode, forward rotation of the third connected member Ca-Cb is allowed.

In addition, by setting the second clutch C2 and the third clutch C3 in the connection mode, the elements of the third planetary gear set PGS3 and the fourth planetary gear set PGS4 are set in a mode in which relative rotation of the elements are disabled, as described in the fourth transmission gear ratio. Thus, the rotational speed of the second connected member Rc-Sb is set to "1". In addition, by setting the first clutch C1 in the connection mode, the rotational speed of the third connected member Ca-Cb is set to "1".

Accordingly, the rotational speeds of the carrier Cb (the fifth element) and the sun gear Sb (the sixth element) of the second planetary gear set PGS2 are set to the same speed "1". Thus, the elements are set in a lock mode in which relative rotation of the elements is disabled. Consequently, the rotational speed of the ring gear Rb (the fourth element) of the second planetary gear set PGS2 having the output gear 3 connected thereto is set to "1" indicated by "6th" illustrated in FIG. 3. In this manner, the sixth transmission gear ratio is established.

In order to establish a seventh transmission gear ratio, the second brake B2 formed from a two-way clutch is set in the reverse rotation prevention mode, the third brake B3 is set in the fixed mode, and each of the first clutch C1 and the third clutch C3 is set in the connection mode. By setting the second brake B2 in the reverse rotation prevention mode, forward rotation of the third connected member Ca-Cb is allowed.

In addition, by setting the third brake B3 in the fixed mode, the rotational speed of the sun gear Sd (the twelfth element) of the fourth planetary gear set PGS4 is set to "0". Furthermore, by setting the third clutch C3 in the connection mode, the rotational speed of the ring gear Rd (the tenth element) of the fourth planetary gear set PGS4 is set to "1", which is the same rotational speed as that of the sun gear Sc (the seventh element) of the third planetary gear set PGS3. Thus, the rotational speed of the first connected member Cc-Ra-Cd is set to k/(k+1).

Still furthermore, by setting the first clutch C1 in the connection mode, the rotational speed of the third connected member Ca-Cb is set to "1", which is the same rotational speed as that of the sun gear Sc (the seventh element) of the third planetary gear set PGS3 connected to the input shaft 2. Thus, the rotational speed of the ring gear Rb (the fourth element) of the second planetary gear set PGS2 having the output gear 3 connected thereto is set to "7th" illustrated in FIG. 3. In this manner, the seventh transmission gear ratio is established.

In order to establish an eighth transmission gear ratio, the second brake B2 formed from a two-way clutch is set in the reverse rotation prevention mode, the third brake B3 is set in the fixed mode, and each of the first clutch C1 and the second clutch C2 is set in the connection mode. By setting the second brake B2 in the reverse rotation prevention mode, forward rotation of the third connected member Ca-Cb is allowed.

In addition, by setting the third brake B3 in the fixed mode, the rotational speed of the sun gear Sd (the twelfth element) of the fourth planetary gear set PGS4 is set to "0". Furthermore, by setting the second clutch C2 in the connection mode, the rotational speed of the second connected member Rc-Sb is set to "0", which is the same rotational speed as that of the sun gear Sd (the twelfth element) of the fourth planetary gear set PGS4. Still furthermore, by setting the first clutch C1 in a connection mode, the rotational speed of the third connected member Ca-Cb is set to "1", which is the same rotational speed of the sun gear Sc (the seventh element) of the third planetary gear set PGS3. Thus, the rotational speed of the ring gear Rb (the fourth element) of the second planetary gear set PGS2 having the output gear 3 connected thereto is set to "8th" illustrated in FIG. 3. In this manner, the eighth transmission gear ratio is established.

In order to establish a reverse gear, the second brake B2 formed from a two-way clutch is set in the forward rotation prevention mode, the third brake B3 are set in the fixed mode, and the third clutch C3 is set in the connection mode. By setting the third brake B3 in the fixed mode and setting the third clutch C3 in a connection mode, the rotational speed of the first connected member Cc-Ra-Cd is set to k/(k+1). In addition, by setting the second brake B2 in the forward rotation prevention mode, forward rotation of the third connected member Ca-Cb is prevented and, thus, the rotational speed of the third connected member Ca-Cb is set to "0". Accordingly, the rotational speed of the ring gear Rb (the fourth element) of the second planetary gear set PGS2 having the output gear 3 connected thereto is set to "Rvs" illustrated in FIG. 3. In this manner, the reverse gear is established.

Note that the speed line indicated by a dashed line in FIG. 3 indicates that among the four planetary gear sets PGS1 to PGS4, elements of the planetary gear sets other than the planetary gear set that transfers drive power rotate (rotate idle) while following the planetary gear set that transfers the drive power.

Figure 4:
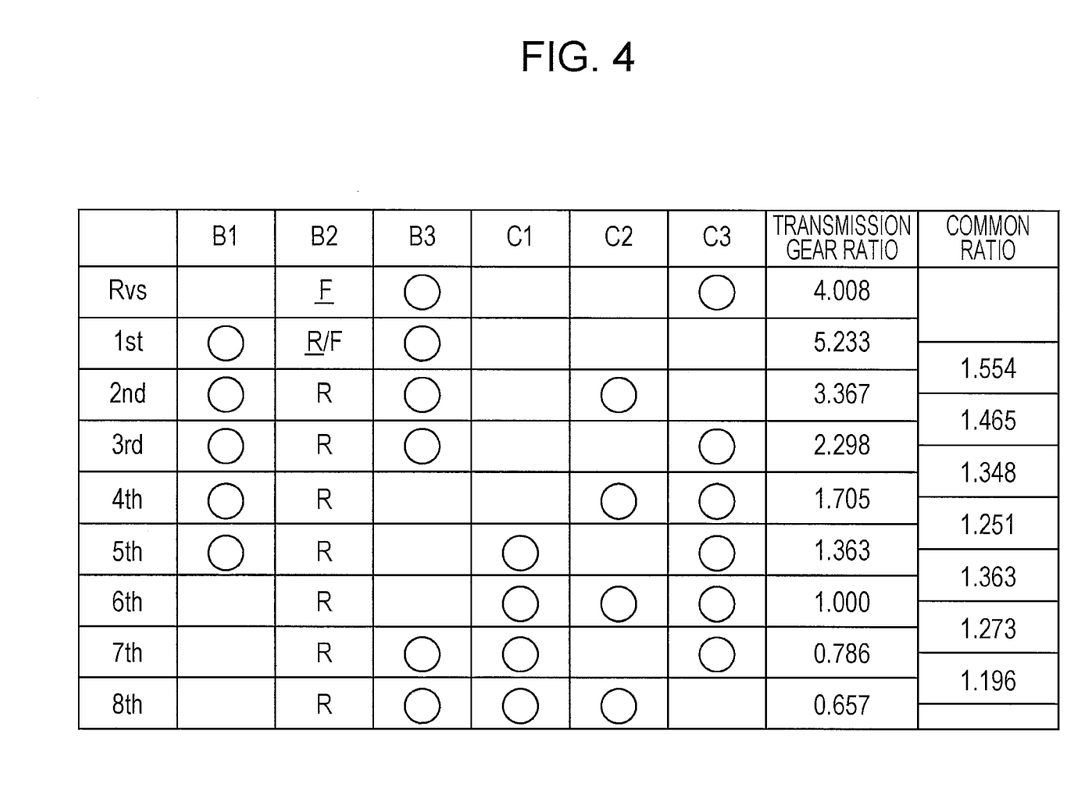
FIG. 4 illustrates all modes of engagement mechanisms for each of gear ratios of the automatic transmission according to the first exemplary embodiment.

FIG. 4 illustrates all the modes of the clutches C1 to C3 and the brakes B1 to B3 in the above-described transmission gear ratios. The symbol "0" in the columns of the first to third clutches C1 to C3 and the first to third brakes B1 to B3 indicates the connection mode or the fixed mode. The empty cells indicate the release mode. In addition, the symbol "R" in the column of the second brake B2 indicates the reverse rotation prevention mode, and the symbol "F" indicates the forward rotation prevention mode.

In addition, the symbols "R" and "F" with an underline indicate that the rotational speed of the third connected member Ca-Cb is set to "0" due to the effect of the second brake B2. In addition, the symbol "R/F" indicates that the reverse rotation prevention mode "R" is maintained at normal times, but the reverse rotation prevention mode "R" is switched to the forward rotation prevention mode "F" when an engine brake is activated.

FIG. 4 further illustrates the transmission gear ratios (the rotational speed of the input shaft 2/the rotational speed of the output gear 3) and the common ratios (the ratio of one of the transmission gear ratios to the next transmission gear ratio, that is, a value obtained by dividing a given transmission gear ratio by the transmission gear ratio that is one-step higher than the transmission gear ratio). In FIG. 4, the gear ratio h of the first planetary gear set PGS1 is set to 2.681, the gear ratio i of the second planetary gear set PGS2 is set to 1.914, the gear ratio j of the third planetary gear set PGS3 is set to 2.734, and the gear ratio k of the fourth planetary gear set PGS4 is set to 1.614. As can be seen from FIG. 4, the common ratios can be set to appropriate values.

In a single pinion planetary gear set PGS having a gear ratio of $\lambda$, the ratio of the external diameters of a sun gear S, a pinion P, and a ring gear R is about $1:(\lambda-1)/2:\lambda$. At that time, the smallest size of the sun gear S is determined by the layout, and the smallest size of the pinion P is determined by the size of the support bearing. Accordingly, in order to reduce the external diameter of the ring gear R, the gear ratio of the single pinion planetary gear set PGS for automobile automatic transmissions is set to about 1.7 to 3.3, in general. Note that in the vicinity of a gear ratio of the lowest value 1.7 or the highest value 3.3, the diameter of the ring gear is relatively large.

According to the automatic transmission of the first exemplary embodiment, each of the gear ratios h, i, and j of the first to third planetary gear sets PGS1 to PGS3 is set to about 1.9 to 2.7. Accordingly, the external diameters of the ring gears Ra, Rb, and Rc can be reduced relative to the fourth planetary gear set PGS4 having a gear ratio k of about 1.6. In addition, as illustrated in FIG. 2, since the sun gear Sc (the seventh element) of the third planetary gear set PGS3 is integrated with the input shaft 2, the ring gear Rc (the ninth element) of the third planetary gear set PGS3 can be easily configured so as to have an external diameter smaller than the ring gear Ra (the third element) of the first planetary gear set PGS1 and the ring gear Rb (the fourth element) of the second planetary gear set PGS2. In this manner, the size of the automatic transmission in the radial direction can be reduced.

According to the automatic transmission of the first exemplary embodiment, an 8-forward-speed transmission can be provided. In addition, seven trains (i.e., first to seventh trains) are arranged in sequence along the axis line of the input shaft 2 from the torque converter-TC side. More specifically, the first train is formed from the first clutch C1, the second train is formed from the first planetary gear set PGS1, the third train is formed from the second planetary gear set PGS2, the fourth train is formed from the third planetary gear set PGS3, the fifth train is formed from the second clutch C2, the sixth train is formed from the fourth planetary gear set PGS4, and the seventh train is formed from the third clutch C3.

The first brake B1 is disposed outward of the first clutch C1 in the first train in the radial direction. The output gear 3 is disposed outward of the second planetary gear set PGS2 in the third train and the third planetary gear set PGS3 in the fourth train in the radial direction. The second brake B2 is disposed outward of the second clutch C2 in the fifth train in the radial direction. In this manner, the mechanisms that constitute the automatic transmission can be configured as seven trains. Accordingly, the shaft length of the automatic transmission can be made shorter than that of the above-described existing 8-forward-speed automatic transmission having eight trains.

In addition, among the wet multiple disc clutches and the wet multiple disc brakes, the number of engagement mechanisms that are set in a release mode (i.e., the number of releases) is less than or equal to three for each of the transmission gear ratios. Therefore, although an 8-forward-speed transmission is provided, an increase in friction loss can be prevented, as compared with existing 8-forward-speed automatic transmissions.

Second Exemplary Embodiment

Figure 5:
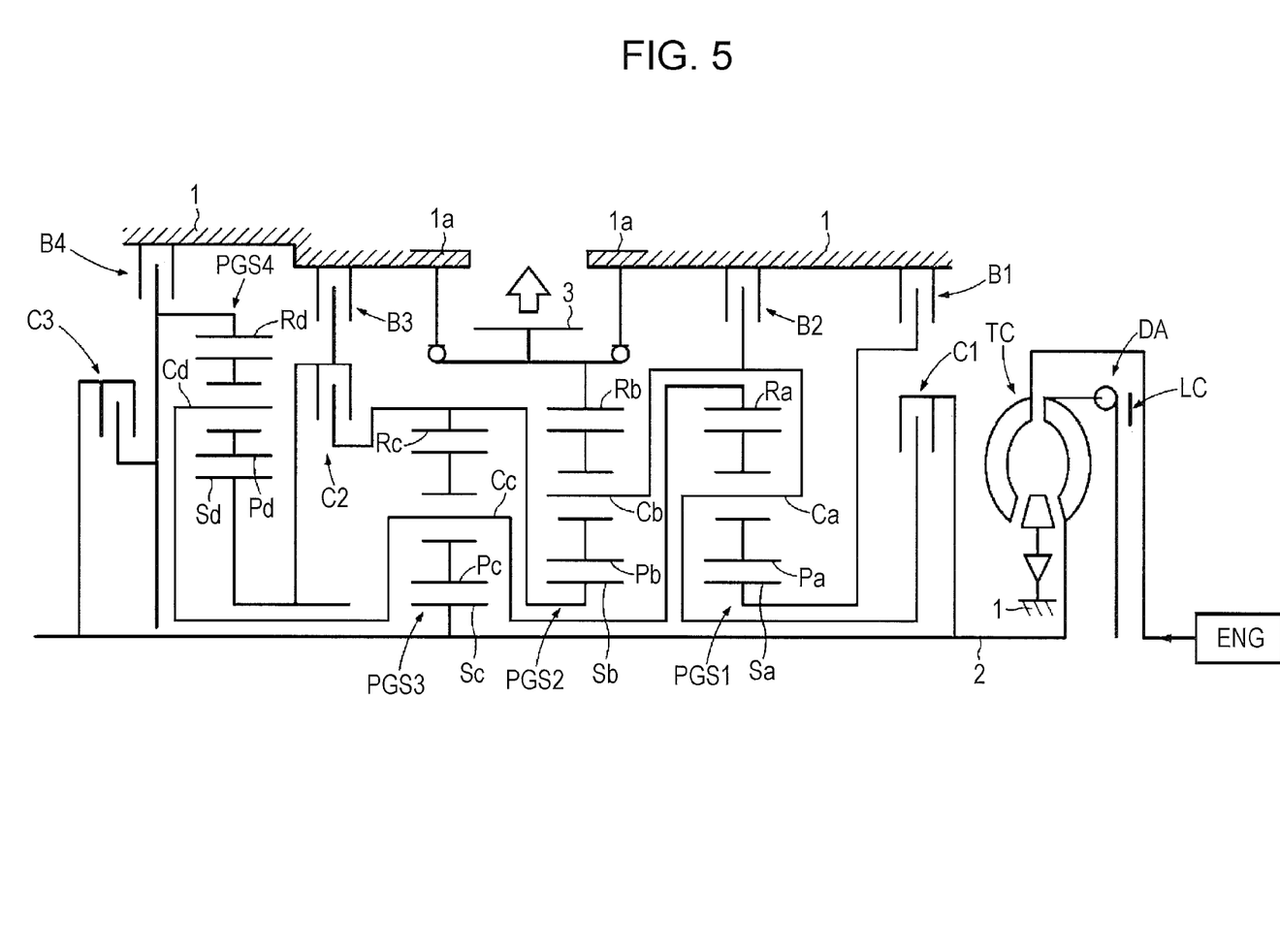
FIG. 5 is a skeleton diagram of an automatic transmission according to a second exemplary embodiment of the present disclosure.

According to a second exemplary embodiment of the disclosure, as illustrated in FIG. 5, an automatic transmission is configured by adding a fourth brake B4 to the above-described automatic transmission according to the first exemplary embodiment. Thus, the automatic transmission of the present exemplary embodiment includes seven engagement mechanisms, that is, three clutches (first to third clutches C1 to C3) and four brakes (first to fourth brakes B1 to B4).

The fourth brake B4 is a wet multiple disc brake. The fourth brake B4 is configured so as to be switchable between a fixed mode in which a ring gear Rd (a tenth element) of the fourth planetary gear set PGS4 is fixed to the transmission case 1 and a release mode in which the ring gear Rd is unfixed from the transmission case 1. Like the clutches C1 to C3 and the brakes B1 to B3, the mode of the fourth brake B4 is switchable on the basis of vehicle information, such as the travel speed of the vehicle, under the control of a transmission control unit (not illustrated).

The fourth brake B4 is disposed outward of the fourth planetary gear set PGS4 in the radial direction. By disposing the four brakes B1 to B4 outward of the planetary gear set or the clutch in the radial direction, the shaft length of the automatic transmission can be decreased, as compared with the configuration in which the brakes B1 to B4 are arranged along the axis line of the input shaft 2 together with the planetary gear set and the clutch.

Figure 6:
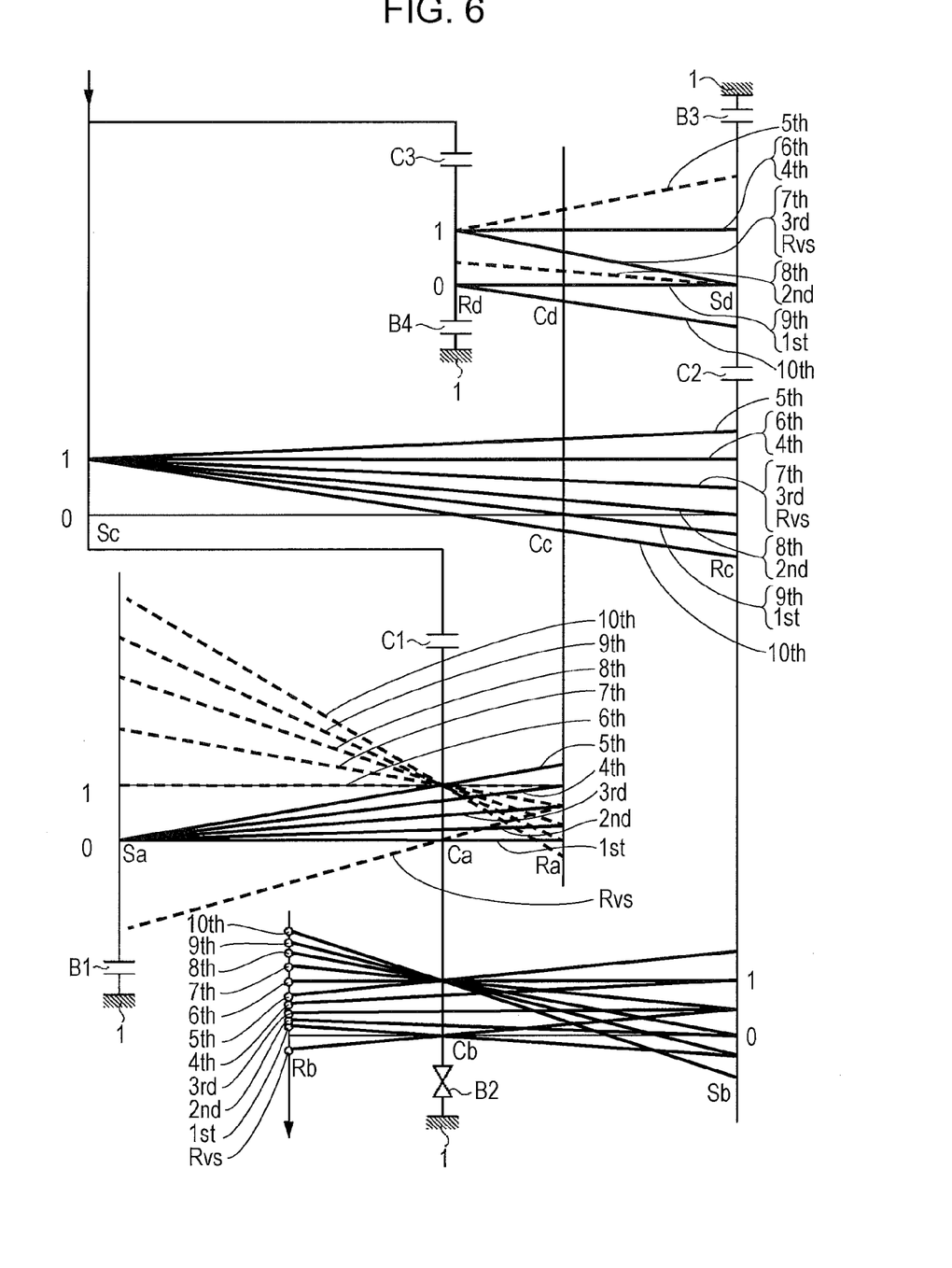
FIG. 6 is a collinear diagram illustrating the relative speed ratios of elements of first to fourth planetary gear sets of the automatic transmission according to the second exemplary embodiment.
Figure 7:
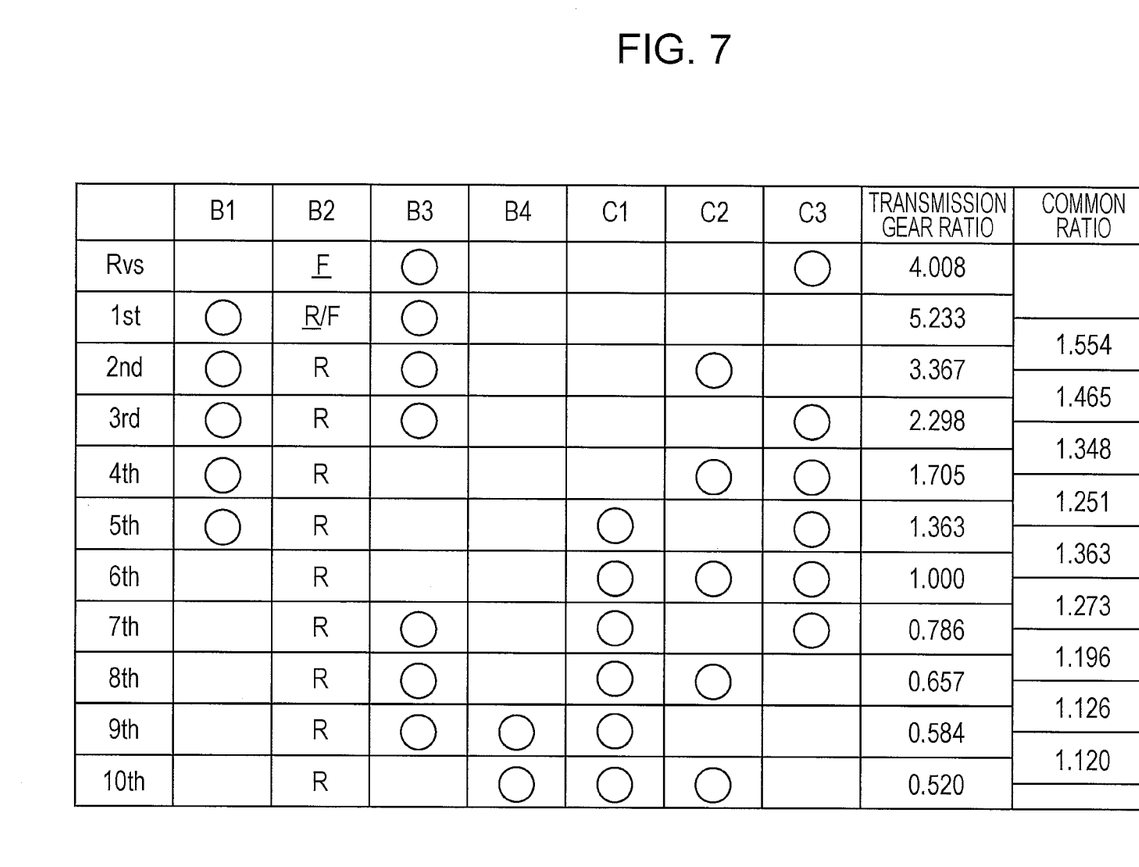
FIG. 7 illustrates all modes of engagement mechanisms for each of gear ratios of the automatic transmission according to the second exemplary embodiment.

A technique for establishing each of the gear ratios of the automatic transmission according to the second exemplary embodiment is described below with reference to FIGS. 6 and 7. Since the techniques for establishing first transmission gear ratio to the eighth transmission gear ratio and the reverse gear are the same as those of the automatic transmission according to the first exemplary embodiment, descriptions of the techniques are not repeated.

In order to establish a ninth transmission gear ratio, the second brake B2 formed from a two-way clutch is set in the reverse rotation prevention mode, each of the third brake B3 and the fourth brake B4 is set in the fixed mode, and the first clutch C1 is set in a connection mode. By setting the second brake B2 in the reverse rotation prevention mode, forward rotation of the third connected member Ca-Cb is allowed.

In addition, by setting the third brake B3 in the fixed mode, the rotational speed of the sun gear Sd (the twelfth element) of the fourth planetary gear set PGS4 is set to "0". Furthermore, by setting the fourth brake B4 in the fixed mode, the rotational speed of the ring gear Rd (the tenth element) of the fourth planetary gear set PGS4 is also set to "0". Accordingly, the elements Sd, Cd, and Rd of the fourth planetary gear set PGS4 are set in a lock mode in which relative rotation of the elements is disabled and, thus, the rotational speed of the first connected member Cc-Ra-Cd of the fourth planetary gear set PGS4 including the carrier Cd (the eleventh element) is also set to "0".

Furthermore, by setting the first clutch C1 in a connection mode, the rotational speed of the third connected member Ca-Cb is set to "1", which is the same rotational speed as that of the sun gear Sc (the seventh element) of the third planetary gear set PGS3. Thus, the rotational speed of the ring gear Rb (the fourth element) of the second planetary gear set PGS2 having the output gear 3 connected thereto is set to "9th" illustrated in FIG. 6. In this manner, the ninth transmission gear ratio is established.

In order to establish a tenth transmission gear ratio, the second brake B2 formed from a two-way clutch is set in the reverse rotation prevention mode, the fourth brake B4 is set in the fixed mode, and each of the first clutch C1 and the second clutch C2 is set in a connection mode. By setting the second brake B2 in the reverse rotation prevention mode, forward rotation of the third connected member Ca-Cb is allowed.

In addition, by setting the second clutch C2 in a connection mode, the second connected member Rc-Sb and the sun gear Sd (the twelfth element) of the fourth planetary gear set PGS4 rotate at the same speed. Furthermore, by setting the fourth brake B4 in the fixed mode, the rotational speed of the ring gear Rd (the tenth element) of the fourth planetary gear set PGS4 is set to "0". Still furthermore, by setting the first clutch C1 in the connection mode, the rotational speed of the third connected member Ca-Cb is set to "1", which is the same rotational speed as that of the sun gear Sc (the seventh element) of the third planetary gear set PGS3. Thus, the rotational speed of the ring gear Rb (the fourth element) of the second planetary gear set PGS2 having the output gear 3 connected thereto is set to "10th" illustrated in FIG. 6. In this manner, the tenth transmission gear ratio is established.

According to the automatic transmission of the second exemplary embodiment, a 10-forward-speed transmission can be provided. In addition, like the automatic transmission according to the first exemplary embodiment, seven trains are arranged in sequence along the axis line of the input shaft 2. Thus, an automatic transmission having the same shaft length can provide a 10-forward-speed transmission.

In addition, among the wet multiple disc clutches and the wet multiple disc brakes, the number of engagement mechanisms that are set in a release mode (i.e., the number of releases) is less than or equal to four for each of the transmission gear ratios. Therefore, although a 10-forward-speed transmission is provided, an increase in friction loss can be prevented, as compared with existing 8-forward-speed automatic transmissions.

While the exemplary embodiments of the present disclosure have been described with reference to the accompanying drawings, the present disclosure is not limited to the exemplary embodiments. For example, while the exemplary embodiments have been described with reference to the ring gear Rb of the second planetary gear set PGS2 that is fixed to the output gear 3, the ring gear Rc of the third planetary gear set PGS3 may be fixed to the output gear 3.

In addition, while the exemplary embodiments have been described with reference to the first brake B1 formed as a wet multiple disk brake and the second brake B2 formed from a two-way clutch, the first brake B1 may be formed from a two-way clutch. In addition, the second brake B2 may be formed as a wet multiple disc brake.

Alternatively, at least one of the first brake B1 and the second brake B2 may be formed from a meshing mechanism.

If the first brake B1 and the second brake B2 are formed as a wet multiple disc brake or a meshing mechanism, the first brake B1 can be set in the fixed mode for the first to fifth transmission gear ratios. For the other transmission gear ratios, the first brake B1 can be set in a release mode. The second brake B2 can be set in the fixed mode for the first and reverse transmission gear ratios. For the other transmission gear ratios, the second brake B2 can be set in a release mode.

Alternatively, if the first brake B1 is formed from a two-way clutch, the first brake B1 can be set in the reverse rotation prevention mode for the first to fifth transmission gear ratios. If an engine brake is activated for the first to fifth transmission gear ratios, the first brake B1 can be switched from the reverse rotation prevention mode to the forward rotation prevention mode.

Still alternatively, the fourth brake B4 may be formed from a meshing mechanism. In such a case, friction loss caused by dragging by the clutch can be reduced.

In the automatic transmission according to the second exemplary embodiment, any one of the transmission gear ratios (e.g., the tenth transmission gear ratio) may be removed so as to provide a 9-forward-speed transmission.

(1) According to an embodiment of the present disclosure, an automatic transmission includes an input shaft rotatably supported inside a transmission case and rotated by a driving force received from a drive source, where rotation of the input shaft is changed into rotation at a plurality of rotational speeds through a plurality of gear ratios and is output from an output member, first to fourth planetary gear sets each including three elements representing a sun gear, a carrier, and a ring gear, where the first to fourth planetary gear sets are arranged in sequence along an axis line of the input shaft, and a plurality of engagement mechanisms each releasably engaging two of the elements with each other or releasably engaging one of the elements with the transmission case. The output member is disposed on the outer circumferences of the second and third planetary gear sets, and the ring gear of one of the second and third planetary gear sets is fixed to the output member. The plurality of gear ratios are achieved by combining a connection mode and a release mode of each of the engagement mechanisms.

According to such a configuration, the output member is disposed on the outer circumferences of the second and third planetary gear sets, and the ring gear of one of the second and third planetary gear sets is fixed to the output member. Accordingly, the shaft length of the automatic transmission can be reduced, as compared with the above-described existing automatic transmissions having second and third planetary gear set and the output member arranged along the axis line of the input shaft. Thus, the mountability of the automatic transmission in automobiles (in particular, front-feel-drive (FFD) automobiles) can be improved.

(2) The output member can be formed as an output gear, and both end portions of the output gear can be supported by an inner wall member of the transmission case via bearings.

According to such a configuration, since both the ends of the output gear serving as the output member are supported, the support stiffness can be improved.

(3) It is desirable that the gear ratios of the second and third planetary gear sets be set so that outer diameters of the second and third planetary gear sets are smaller than outer diameters of the first and fourth planetary gear sets disposed at both ends of the automatic transmission in the axis direction of the automatic transmission.

According to such a configuration, since the outer diameters of the second and third planetary gear sets are smaller than the outer diameters of the first and fourth planetary gear sets, the size of the automatic transmission in the radial direction can be reduced.

(4) The three elements of the first planetary gear set can be defined as a first element, a second element, and a third element in a collinear diagram capable of representing relative rotational speed ratios of the elements in the form of straight lines, and the first element, the second element, and the third element can be arranged in the collinear diagram in sequence from one side of the collinear diagram at intervals corresponding to transmission gear ratios of the collinear diagram. The three elements of the second planetary gear set can be defined as a fourth element, a fifth element, and a sixth element in a collinear diagram, and the fourth element, the fifth element, and the sixth element can be arranged in sequence from one side of the collinear diagram at intervals corresponding to transmission gear ratios of the collinear diagram. The three elements of the third planetary gear set can be defined as a seventh element, an eighth element, and a ninth element in a collinear diagram, and the seventh element, the eighth element, and the ninth element can be arranged in sequence from one side of the collinear diagram at intervals corresponding to transmission gear ratios of the collinear diagram. The three elements of the fourth planetary gear set can be defined as a tenth element, an eleventh element, and a twelfth element in a collinear diagram, and the tenth element, the eleventh element, and the twelfth element can be arranged in sequence from one side of the collinear diagram at intervals corresponding to transmission gear ratios of the collinear diagram. The seventh element can be connected to the input shaft, the fourth element can be connected to the output member, the third element, the eighth element, and the eleventh element can be connected to form a first connected member, the sixth element can be connected to the ninth element to form a second connected member, and the second element can be connected to the fifth element to form a third connected member. The engagement mechanisms can be formed from first to third clutches and first to third brakes, the first clutch can be configured to releasably connect the seventh element to the third connected member, the second clutch can be configured to releasably connect the twelfth element to the second connected member, the third clutch can be configured to releasably connect the seventh element to the tenth element, the first brake can be configured to releasably fix the first element to the transmission case, the second brake can be configured to releasably fix the third connected member to the transmission case, and the third brake can be configured to releasably fix the twelfth member to the transmission case. Among the six engagement mechanisms formed from the first to third clutches and the first to third brakes, by setting at least three engagement mechanisms in one of the connection mode and the fixed mode, at least eight forward transmission gear ratios can be achieved.

As can be seen from description of a first exemplary embodiment below, according to such a configuration, eight forward transmission gear ratios can be achieved. In addition, as can be seen from description of a second exemplary embodiment below, by adding a brake, nine forward transmission gear ratios or ten forward transmission gear ratios can be achieved without increasing the number of trains and without increasing the shaft length.

Obviously, numerous modifications and variations of the present invention are possible in light of the above teachings. It is therefore to be understood that within the scope of the appended claims, the invention may be practiced otherwise than as specifically described herein.

What is claimed is:
1. An automatic transmission comprising:
a transmission case;
an input shaft rotatably supported inside the transmission case to be rotated by a driving force received from a drive source;
first, second, third, and fourth planetary gear sets arranged in sequence along an axis line of the input shaft and each including three elements comprising a sun gear, a carrier, and a ring gear;
a plurality of engagement mechanisms each releasably connecting two of the three elements with each other or releasably connecting one of the three elements to the transmission case; and
an output member being disposed on outer circumferences of the second and third planetary gear sets and connected to the ring gear of one of the second and third planetary gear sets to output rotation of the input shaft which is capable of being changed to a plurality of rotational speeds by combining a connection mode and a release mode of each of the engagement mechanisms;
wherein the three elements of the first planetary gear set are defined as a first element, a second element, and a third element,
wherein the three elements of the second planetary gear set are defined as a fourth element, a fifth element, and a sixth element,
wherein the three elements of the third planetary gear set are defined as a seventh element, an eighth element, and a ninth element,
wherein the three elements of the fourth planetary gear set are defined as a tenth element, an eleventh element, and a twelfth element,
wherein the seventh element is connected to the input shaft, and the fourth element is connected to the output member,
wherein the third element, the eighth element, and the eleventh element are connected to form a first connected member, the sixth element is connected to the ninth element to form a second connected member, and the second element is connected to the fifth element to form a third connected member,
wherein the engagement mechanisms comprise six engagement mechanisms formed from first to third clutches and first to third brakes, the first clutch is configured to releasably connect the seventh element to the third connected member, the second clutch is configured to releasably connect the twelfth element to the second connected member, the third clutch is configured to releasably connect the seventh element to the tenth element, the first brake is configured to releasably fix the first element to the transmission case, the second brake is configured to releasably fix the third connected member to the transmission case, and the third brake is configured to releasably fix the twelfth member to the transmission case, and
wherein among the six engagement mechanisms formed from the first to third clutches and the first to third brakes, by setting at least three engagement mechanisms in one of the connection mode and the fixed mode, at least eight forward transmission gear ratios are achieved.

2. The automatic transmission according to claim 1, wherein the output member comprises an output gear, and wherein the output gear has end portions, both end portions of the output gear are supported by an inner wall member of the transmission case via bearings.

3. The automatic transmission according to claim 2, wherein the output gear is disposed outward of the second planetary gear set and the third planetary gear set at a location over the second planetary gear set and the third planetary gear set in an axial direction.

4. The automatic transmission according to claim 1, wherein gear ratios of the second and third planetary gear sets are set so that outer diameters of the second and third planetary gear sets are smaller than outer diameters of the first and fourth planetary gear sets disposed at both ends of the automatic transmission in the axis direction of the automatic transmission.

5. The automatic transmission according to claim 1, wherein the output member is disposed outward of the second planetary gear set and the third planetary gear set at a location over the second planetary gear set and the third planetary gear set in an axial direction.

6. The automatic transmission according to claim 1, wherein the output member overlaps at least one of the outer circumferences of the second and third planetary gear sets.

7. The automatic transmission according to claim 1, wherein the output member is directly connected to the ring gear of one of the second and third planetary gear sets.

* * * * *